Feb. 12, 1952     J. C. DANLY ET AL     2,585,539
METHOD OF MAKING SOLID FRICTION DISKS
Filed Jan. 14, 1950
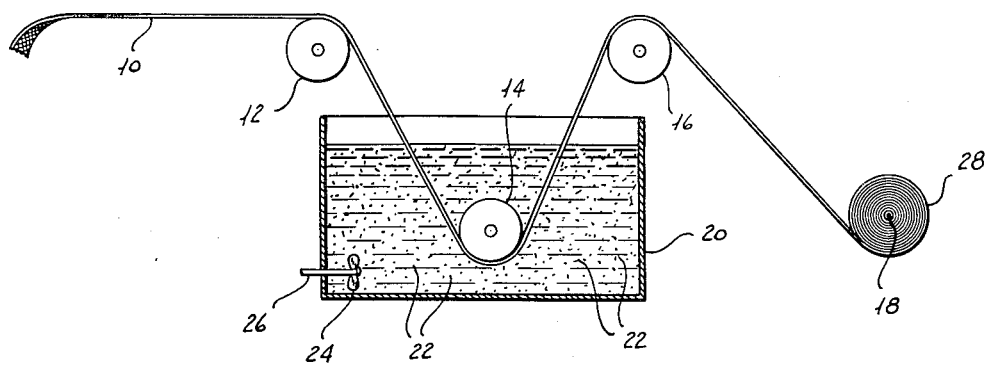
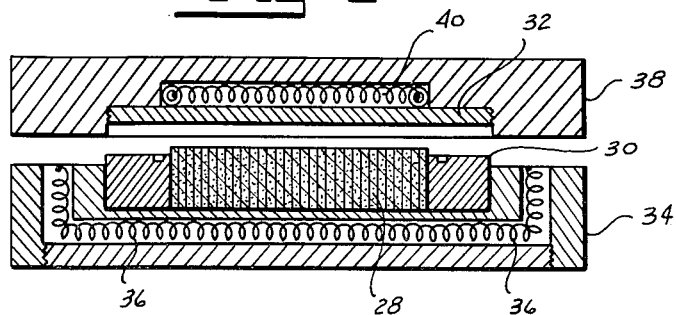
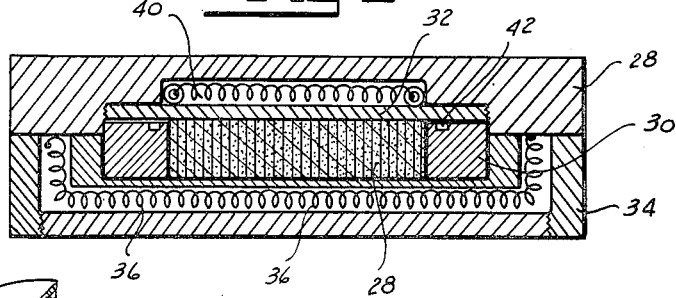
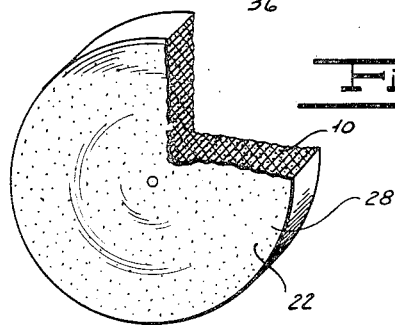
INVENTOR.
JAMES C. DANLY
VASIL GEORGEFF
BY Harry L. Shevies
ATTORNEY Patented Feb. 12, 1952

2,585,539

UNITED STATES PATENT OFFICE 2,585,539

METHOD OF MAKING SOLID FRICTION DISKS

James C. Danly, River Forest, and Vasil Georgeff, Chicago, Ill., assignors to Danly Machine Specialties, Inc., Chicago, Ill., a corporation of Illinois Application January 14, 1950, Serial No. 138,654

1 Claim. (Cl. 154—81)

Our invention relates to a friction disk and method of making same, and more particularly to a friction disk for use in clutches and brakes and a novel method of forming the friction disk.

Power presses are customarily operated by a constantly running motor which drives a flywheel. The flywheel stores the energy required for the press operation. The gear train of the press is normally immobilized by a brake. When it is desired to place the press into operation the brake is released and the clutch is simultaneously operated to engage the flywheel with the gear train of the press. The constant starting and stopping of the press places a tremendous load upon the friction lining material of the press. In one type of clutch and brake for power presses circular friction disks are employed. If the friction disks are made of a solid material a noisy and harsh operation of the press ensues. Accordingly, a woven fabric made of asbestos reinforced with wire is normally employed. This fabric is sufficiently soft to provide a cushioning effect minimizing the noisy harsh action obtained from solid disks. It is impractical, however, to weave fabrics sufficiently thick to form disks and it was first attempted to build disks by laminating material. It was found that the shearing forces involved frequently cause the bond between laminations to fail and the lamination exposed to wear frays and quickly deteriorates. The asbestos fiber has good wearing characteristics, will not cut the coacting friction plates and is noncombustible. It has a tendency, however, to squeal, again making for noisy operation.

One object of our invention is to provide a friction disk for brakes and clutches which will eliminate the disadvantages of the prior art in providing a smooth-acting friction surface which will withstand many hours of use.

Another object of our invention is to provide a friction disk which is quiet and sure in operation.

Another object of our invention is to provide a novel method of manufacturing friction disks.

Other and further objects of our invention will appear from the following description.

In general our invention contemplates impregnating a tape woven of asbestos fiber with a compound comprising a phenol condensation product or synthetic rubber or a mixture of these, winding the impregnated tape spirally to form a disk of the desired diameter having a thickness equal to the thickness of the tape, and then setting the binder and the spirally wound assembly by means of heat and pressure to form the desired friction disk. The impregnating composition is intermixed with finely divided lead to act as a lubricant. The amount of lead may vary within wide limits. From fifty per cent by weight to ten per cent by weight of the binder material of finely divided lead may be used and intimately mixed with the binder material before the tape is impregnated. The tape may then be passed through a bath containing the binding material with the finely divided lead, rolled into a spiral and then placed into a die to be set by heat and pressure. The binding material may be a phenol-formaldehyde condensation product. This is a thermo-setting resin which may be set at a temperature of about 350° F. and a pressure of two thousand pounds per square inch. Synthetic rubbers, such as chloroprene rubber, olefin polysulfide reaction products and butadiene-acrylonitrile copolymer and the like which can be vulcanized like rubber may also be used as the binder material. These materials may be cured at temperatures around 320° F., held for about ten minutes. A mixture of a phenol condensation product and a synthetic rubber in varying proportions may also be used. If desired, a major amount of phenol condensation product and a minor amount of synthetic rubber may be admixed with the finely divided lead, or a major amount of synthetic rubber and a minor amount of phenol condensation product may be admixed with the finely divided lead to form the bath through which the asbestos tape is passed before being rolled into a spiral.

In the accompanying drawings which form part of the instant specification and which are to be read in conjunction therewith:

Figure 1 is a diagrammatic view showing the process of impregnating an asbestos tape with the binder and rolling it spirally into a disk.

Figure 2 is a sectional view showing the impregnated disk placed in a die about to be closed.

Figure 3 is a view of the disk during the step of being subjected to heat and pressure.

Figure 4 is a perspective view of the disk with a part broken away.

More particularly, referring now to the drawings, a tape 10 formed of asbestos braid of a width slightly in excess of the thickness of the desired finished friction disk is fed over roller 12, roller 14 and roller 16 to a small mandrel 18 which is rotated by any suitable means to wind the asbestos tape spirally upon itself. The asbestos tape may include brass or copper wire intermeshed therewith to give it added strength. The roller 14 is positioned in a tank 20 which contains the binder of a liquid phenol condensation product or a liquid synthetic rubber or a mixture of these, together with finely divided lead particles 22 intimately admixed with the liquid binder. An agitator 24 driven from shaft 26 from any suitable mover (not shown) serves to keep the finely divided lead particles in suspension. The tape being immersed in the bath becomes impregnated with the binder and the lead particles and is wound into spiral form to form a roll 28. When this roll reaches the desired diameter the end of the tape is severed and the roll 28 is placed in a die 30 whose internal diameter is equal to the diameter of the desired disk and whose depth is slightly less than the desired thickness of the finished friction disk. A plate 32 is adapted to coact with the die 30. A lower heating member 34 housing a resistance heating element 36 and an upper heating member housing an electrical resistance heating element 40 serve to house the lower die 30 and the upper plate 32. The temperature is controlled to the desired molding temperature in the vicinity of 330° F. The die may be placed in a press and the plate brought into pressure contact with the die 30 under a pressure of about two thousand pounds per square inch. As the pressure is exerted, the spirally wound asbestos braid impregnated with the binder will assume the shape shown in Figure 3. The binding material is forced through the interstices and pores of the asbestos fabric and excess binding material flows out of the top of the die 30 into the overflow gutter 42 provided for this purpose. The heat and pressure are maintained for a sufficient time to set the binder. A time from between nine to fourteen minutes is sufficient, depending on the particular binding composition used. After the pressure has been released it will be found that the upper surface of the finished disk will spring back from about one-sixty-fourth of an inch to one-thirty-second of an inch so that the depth of the cavity in the die 30 will be slightly less than the thickness of the desired friction disk. The finished friction disk will have a high coefficient of friction with the metal surface of the coacting clutch or brake plates. It will give a very smooth and quiet action. It will be sufficiently soft not to cut or score the metal brake plates and will have excellent wearing characteristics and will not squeal in spite of the high coefficient of friction. We have found that in use the contact surface of the finished friction disk will assume a smooth and glossy appearance, indicating that slight variations of the surfaces either wear or flow to give a substantially plane contact surface having an extremely long life under the most rigorous of working conditions. The contact surface of the disk, furthermore, will not wear or fray or deteriorate in use.

It will be seen that we have accomplished the objects of our invention. We have provided a friction disk for brakes and clutches which has a smooth-acting friction surface which will withstand many hours of use, and which is quiet and sure in operation. We have provided a novel method of manufacturing friction disks.

It will be understood that certain features and subcombinations are of utility and may be employed without reference to other features and subcombinations. This is contemplated by and is within the scope of our claim. It is further obvious that various changes may be made in details within the scope of our claim without departing from the spirit of our invention. It is therefore to be understood that our invention is not to be limited to the specific details shown and described.

Having thus described our invention, what we claim is:

A method of making solid friction disks including the steps of impregnating a woven tape having a width greater than the thickness of the desired disk with an excess of a thermosetting binder, winding the tape spirally upon itself along planes normal to the axis of the disk to form a solid disk of the desired diameter having substantially continuous side surfaces, reducing the thickness of the disk while maintaining the desired diameter, removing the excess of binder during the thickness-reducing step and setting the binder by heat and pressure to form a solid friction disk of the desired diameter and of predetermined thickness.

JAMES C. DANLY.
VASIL GEORGEFF.

REFERENCES CITED

The following references are of record in the file of this patent:

UNITED STATES PATENTS

| Number | Name | Date |
| --- | --- | --- |
| 2,025,052 | Hess | Dec. 24, 1935 |
| 2,049,974 | Patrick | Aug. 4, 1936 |
| 2,096,692 | Cilley | Oct. 19, 1937 |